United States Patent
Kaizu et al.

(10) Patent No.: US 7,864,468 B2
(45) Date of Patent: Jan. 4, 2011

(54) MAGNETIC RECORDING AND REPRODUCING APPARATUS INCLUDING A MAGNETIC RECORDING MEDIUM AND A MAGNETIC HEAD FOR RECORDING DATA ON THE MAGNETIC RECORDING MEDIUM

(75) Inventors: Akimasa Kaizu, Tokyo (JP); Yoshikazu Soeno, Tokyo (JP); Katsumichi Tagami, Tokyo (JP)

(73) Assignee: TDK Corporation, Tokyo (JP)

( * ) Notice: Subject to any disclaimer, the term of this patent is extended or adjusted under 35 U.S.C. 154(b) by 185 days.

(21) Appl. No.: 12/230,307

(22) Filed: Aug. 27, 2008

(65) Prior Publication Data
US 2009/0059409 A1    Mar. 5, 2009

(30) Foreign Application Priority Data

Aug. 30, 2007  (JP)  ............................... 2007-224295
Jul. 4, 2008   (JP)  ............................... 2008-176148

(51) Int. Cl.
*G11B 5/09*  (2006.01)
*G11B 5/02*  (2006.01)

(52) U.S. Cl. .......................................... 360/48; 360/55
(58) Field of Classification Search .................. 360/48, 360/59, 110, 125.02, 125.03
See application file for complete search history.

(56) References Cited

U.S. PATENT DOCUMENTS 5,815,343 A   9/1998  Ishikawa et al.
7,209,313 B2*  4/2007  Tagami .................... 360/77.08
2007/0053107 A1  3/2007  Kimura et al.
2007/0253106 A1* 11/2007  Sato et al. .................... 360/126
2009/0273858 A1  11/2009  Kimura et al.

FOREIGN PATENT DOCUMENTS

| JP | A-7-73433 | 3/1995 |
| JP | A-2002-359138 | 12/2002 |
| JP | A-2006-48860 | 2/2006 |
| JP | A-2006-286085 | 10/2006 |
| JP | A-2007-66475 | 3/2007 |

* cited by examiner

*Primary Examiner*—Daniell L Negrón
*Assistant Examiner*—Regina N Holder
(74) *Attorney, Agent, or Firm*—Oliff & Berridge, PLC

(57) ABSTRACT

The magnetic recording and reproducing apparatus includes: a perpendicular recording magnetic recording medium including a track pattern including track portions and gap portions arranged so as to be alternately adjacent to each other in a cross-track direction, at least part of portions corresponding to the track portions being recording areas having the width substantially the same as the width of the track portions, portions between the recording areas being non-recording areas; and a magnetic head of a perpendicular recording type for applying a recording magnetic field to the recording areas. The anisotropic magnetic field Hk (T) of the recording areas of the magnetic recording medium and the recording magnetic field intensity Fw (t) of the recording magnetic field at the upper surface of the recording areas satisfy the following inequality (I):

$$0.23 \times Fw + 1.2 \leq Hk \leq 0.26 \times Fw + 1.6. \quad (I)$$

6 Claims, 12 Drawing Sheets

MAGNETIC RECORDING AND REPRODUCING APPARATUS INCLUDING A MAGNETIC RECORDING MEDIUM AND A MAGNETIC HEAD FOR RECORDING DATA ON THE MAGNETIC RECORDING MEDIUM

BACKGROUND OF THE INVENTION

1. Field of the Invention

The present invention relates to a magnetic recording and reproducing apparatus including a magnetic recording medium and a magnetic head for recording data on the magnetic recording medium. In the magnetic recording medium, portions corresponding to track portions or parts thereof serve as recording areas having a width substantially the same as the width of the tracks, and portions between the recording areas serve as non-recording areas.

2. Description of the Related Art

A significant improvement in the areal density of conventional magnetic recording media such as hard disks has been achieved by, for example, improving the material used to form the recording layer and improving the precision of head processing.

In a magnetic recording and reproducing apparatus including a magnetic recording medium of the perpendicular recording type and a magnetic head of the perpendicular recording type for recording data on the magnetic recording medium, the areal density is increased by orienting magnetic particles such that their magnetization direction is perpendicular to the surface of the medium. This type of magnetic recording and reproducing apparatus has become widespread.

Moreover, magnetic recording media have been proposed in which portions corresponding to track portions or parts thereof serve as recording areas having a width substantially the same as the width of the tracks and in which portions between the recording areas serve as non-recording areas.

For example, magnetic recording media such as discrete track media and patterned media have been proposed (see, for example, Japanese Patent Application Laid-Open No. 2006-048860). In the discrete track media, the recording layer is formed in a concavo-convex pattern corresponding to a track pattern, and the convex portions of the recording layer serve as the recording areas having the shape of the track portion. In the patterned media, convex portions of the recording layer serve as the recording areas having a shape formed by circumferentially dividing track portions.

Moreover, other magnetic recording media have been proposed in, for example, Japanese Patent Application Laid-Open Nos. 2006-286085 and 2002-359138. In these magnetic recording media, portions corresponding to the recording areas or non-recording areas in the recording layer are subjected to ion injection treatment or treatment using a reaction gas to thereby divide the recording layer into non-recording areas in which the saturation magnetization is substantially zero and into recording areas in which the saturation magnetization is non-zero.

When the non-recording area is present between the recording areas as described above, incorrect recording of information on a recording area adjacent to a target recording area, crosstalk between adjacent recording areas, and the like are expected to be suppressed. With the technologies described above, a further improvement in the areal density is expected in the future.

In high areal density magnetic recording media such as magnetic recording media of the perpendicular recording type, it is believed that it is preferable to use a material with a large anisotropic magnetic field as the material for the recording areas. The use of a material with a large anisotropic magnetic field as the material for the recording areas can suppress incorrect recording of information on a recording area adjacent to a target recording area.

However, as the areal density of a magnetic recording medium increases, the width of the magnetic pole of the magnetic head decreases, and therefore the intensity of the recording magnetic field applied from the magnetic head to the magnetic recording medium tends to decrease. Therefore, a magnetic signal may not be recorded in its target recording area when a material with a large anisotropic magnetic field is used as the material for the recording areas and the intensity of the recording magnetic field decreases as described above.

For example, the intensity of the recording magnetic field can be increased by increasing the width of the magnetic pole of the magnetic head. However, in such a case, a magnetic signal can be incorrectly recorded in a recording area adjacent to the target recording area.

SUMMARY OF THE INVENTION

In view of the foregoing problems, various exemplary embodiments of this invention provide a magnetic recording and reproducing apparatus that can reliably record a magnetic signal only in the target recording area of a magnetic recording medium having a high areal density.

In the course of arriving at various exemplary embodiments of the present invention, the present inventors performed simulations using different values of parameters for magnetic recording media. Consequently, the inventors have found the following for a magnetic recording medium in which portions corresponding to track portions or parts thereof are recording areas and portions between the recording areas are non-recording areas. That is, even when the anisotropic magnetic field of the recording areas is smaller than the value conventionally presumed, a magnetic signal can be recorded in the intended target recording area and incorrect recording of a magnetic signal in a recording area adjacent to a target recording area can be suppressed so long as the anisotropic magnetic field Hk of the recording areas of the magnetic recording medium and the recording magnetic field intensity Fw of the recording magnetic field at the upper surface of the recording areas satisfy a predetermined relationship.

As described above, in the magnetic recording medium in which portions corresponding to the track portions or parts thereof serve as the recording areas and portions between the recording areas serve as the non-recording areas, even when the areal density is high, the anisotropic magnetic field of the recording areas can be smaller than that conventionally presumed. Various exemplary embodiments of the present invention are based on the findings described above and realize a magnetic recording and reproducing apparatus that can reliably record a magnetic signal only in the target recording area. Therefore, various exemplary embodiments of the present invention have been made based on a concept different from the concept used in conventional technology in which a material with a large anisotropic magnetic field is used as the material for the recording layer of a high areal density magnetic recording medium (for example, 300 Gbpsi or more) such as a magnetic recording medium of the perpendicular recording type.

Accordingly, various exemplary embodiments of this invention provide a magnetic recording and reproducing apparatus, comprising: a magnetic recording medium of a perpendicular recording type, the magnetic recording medium including a track pattern having track portions and gap portions arranged so as to be alternately adjacent to each other in a cross-track direction, at least part of portions corresponding to the track portions being recording areas having a width substantially the same as a width of the track portions, portions between the recording areas being non-recording areas; and a magnetic head of a perpendicular recording type for applying a recording magnetic field to the recording areas, wherein an anisotropic magnetic field Hk (T) of the recording areas of the magnetic recording medium and a recording magnetic field intensity Fw (T) of the recording magnetic field at an upper surface of the recording areas satisfy the following inequality (I):

$$0.23 \times Fw + 1.2 \leq Hk \leq 0.26 \times Fw + 1.6. \quad (I)$$

Moreover, various exemplary embodiments of this invention provide a magnetic recording and reproducing apparatus, comprising: a magnetic recording medium of a perpendicular recording type, the magnetic recording medium including a track pattern having track portions and gap portions arranged so as to be alternately adjacent to each other in a cross-track direction, at least part of portions corresponding to the track portions being recording areas having a width substantially the same as a width of the track portions, portions between the recording areas being non-recording areas; and a magnetic head of a perpendicular recording type for applying a recording magnetic field to the recording areas, wherein an anisotropic magnetic field Hk (T) of the recording areas of the magnetic recording medium and a recording magnetic field intensity Fw (t) of the recording magnetic field at an upper surface of the recording areas are limited within one of the following ranges (i), (ii), (iii), (iv), and (v):

(i) $1.1 \leq Fw \leq 1.2$ and $1.5 \leq Hk \leq 1.9$;
(ii) $1.2 \leq Fw \leq 1.3$ and $1.5 \leq Hk \leq 1.9$;
(iii) $1.3 \leq Fw \leq 1.4$ and $1.5 \leq Hk \leq Fw + 0.6$;
(iv) $1.4 \leq Fw \leq 1.5$ and $Fw + 0.1 \leq Hk \leq 2.0$; and
(v) $1.5 \leq Fw \leq 1.6$ and $1.6 \leq Hk \leq 2.0$.

In the description of the present application, the phrase "a track pattern having track portions and gap portions arranged so as to be alternately adjacent to each other in a cross-track direction" is used to include a track pattern having concentric circular or arc-shaped track portions and a track pattern having a spiral track portion.

In the description of the present application, the phrase "at least part of portions corresponding to the track portions being recording areas having a width substantially the same as a width of the track portions" is used to include: the case in which the entire track portion serves as the recording area having a shape corresponding to the shape of the track portion; and the case in which parts of the track portion serve as the recording areas having a shape obtained by circumferentially dividing the track portion. When the recording areas have the shape obtained by circumferentially dividing the track portion, not only portions corresponding to the gap portions of the track pattern but also portions between the circumferentially divided recording areas of the track portion serve as the non-recording areas.

In the description of the present application, the term "cross-track direction" is used to refer to a direction substantially parallel to the track width direction and the gap width direction.

In the description of the present application, the term "recording area" is used to refer to an area in which the magnetization can be reversed by applying a recording magnetic field and which has the ability to retain a recorded magnetic signal in a reproducible manner.

In the description of the present application, the term "non-recording area" is used to refer to an area in which the ability to retain a magnetic signal is lower than that of the recoding area or an area which does not substantially have the ability to retain a magnetic signal in a reproducible manner. More specifically, the non-recording area refers to an area in which, after magnetic signals are recorded in the magnetic recording medium, the magnetic field generated from this area is smaller than the magnetic field generated from the recording area or is substantially absent. The non-recording area may be formed of a non-magnetic material separating the recording area. Alternatively, the non-recording area may be formed of a material that magnetically influences only to a negligible extent or a magnetic material having the ability to retain a magnetic signal lower than that of the recording area. Moreover, the non-recording area may be a gap.

Moreover, in the description of the present application, the term "a magnetic recording medium" is not limited to a medium, such as hard disks and floppy (registered trademark) disks, in which magnetism alone is used to record and reproduce magnetic signals. This term is also used to refer to magneto-optical recording medium, such as MO disks, in which both magnetism and light are used and to heat assisted type recording medium in which both magnetism and heat are used.

According to various exemplary embodiments of the present invention, a magnetic signal can be reliably recorded only in a target recording area of a magnetic recording medium having a high areal density.

DETAILED DESCRIPTION OF THE PREFERRED EMBODIMENTS

Hereinafter, preferred exemplary embodiments of the present invention will be described in detail with reference to the drawings.

Figure 1:
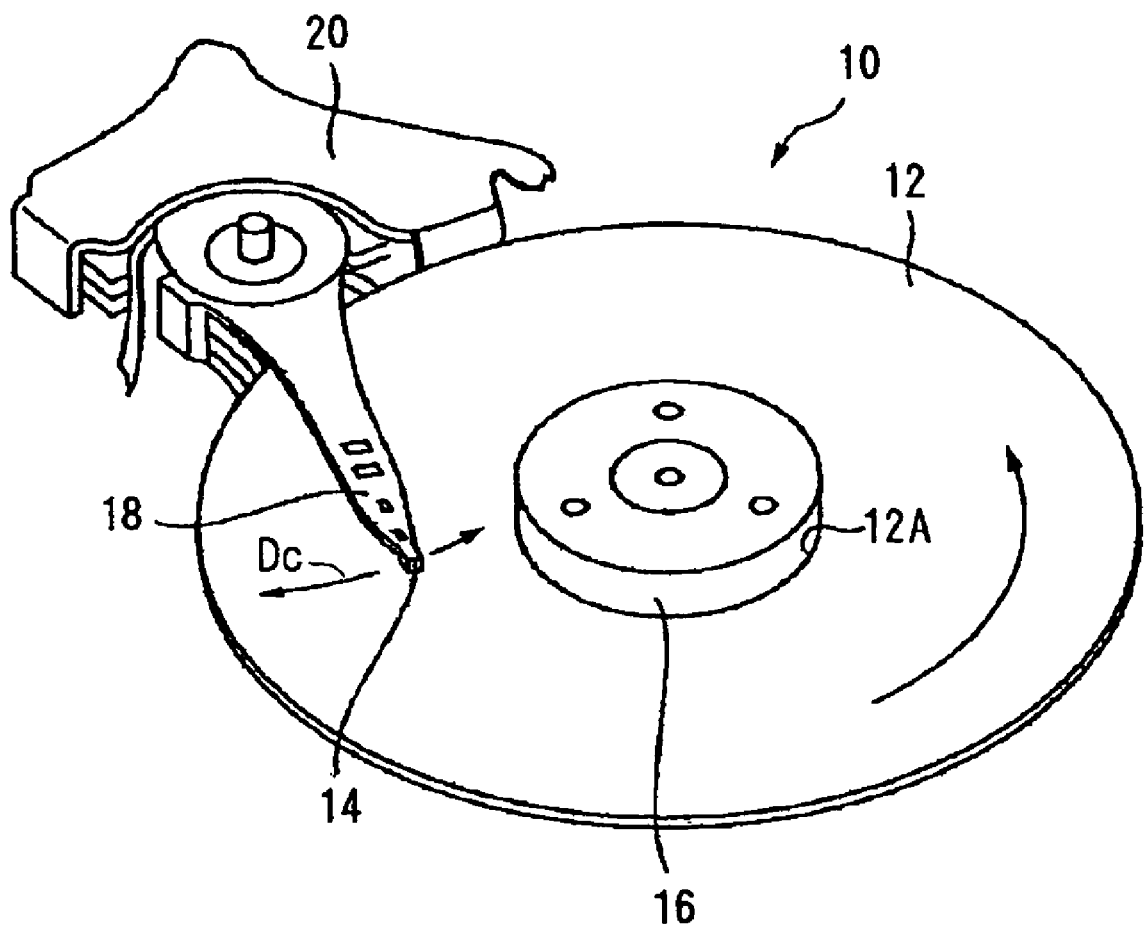
FIG. 1 is a perspective view illustrating the schematic structure of a magnetic recording and reproducing apparatus according to an exemplary embodiment of the present invention.

As shown in FIG. 1, a magnetic recording and reproducing apparatus 10 according to an exemplary embodiment of the present invention includes a magnetic recording medium 12 of the perpendicular recording type and a magnetic head 14 of the perpendicular recording type. In order to record-reproduce magnetic signals on-from the magnetic recording medium 12, the magnetic head 14 is disposed so as to be capable of flying in close proximity to the surface of the magnetic recording medium 12.

The magnetic recording medium 12 has a center hole 12A and is secured to a chuck 16 through the center hole 12A. The magnetic recording medium 12 is rotatable together with the chuck 16. The magnetic head 14 is attached near the end of an arm 18, and the arm 18 is rotatably attached to a base 20. Therefore, the magnetic head 14 can move along an arc-shaped trajectory along the cross-track direction Dc (radial direction) of the magnetic recording medium 12 while located in close proximity to the surface of the magnetic recording medium 12.

Figure 2:
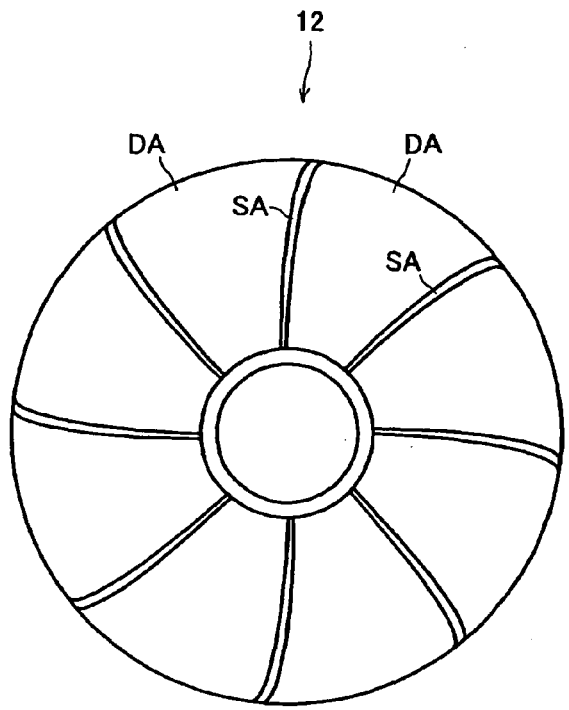
FIG. 2 is a plan view illustrating the schematic structure of a magnetic recording medium of the magnetic recording and reproducing apparatus.

The magnetic recording medium 12 is a substantially disk-shaped discrete track medium. As shown in FIG. 2, the magnetic recording medium 12 is divided into a plurality of servo areas SA provided at suitable intervals in the circumferential direction and a plurality of data areas DA partitioned by the servo areas SA. A track pattern in each of the data areas DA is a pattern in which concentric arc-shaped track portions having a predetermined track width Tw and gap portions having a predetermined gap width Gw are alternately arranged in the cross-track direction Dc.

Figure 3:
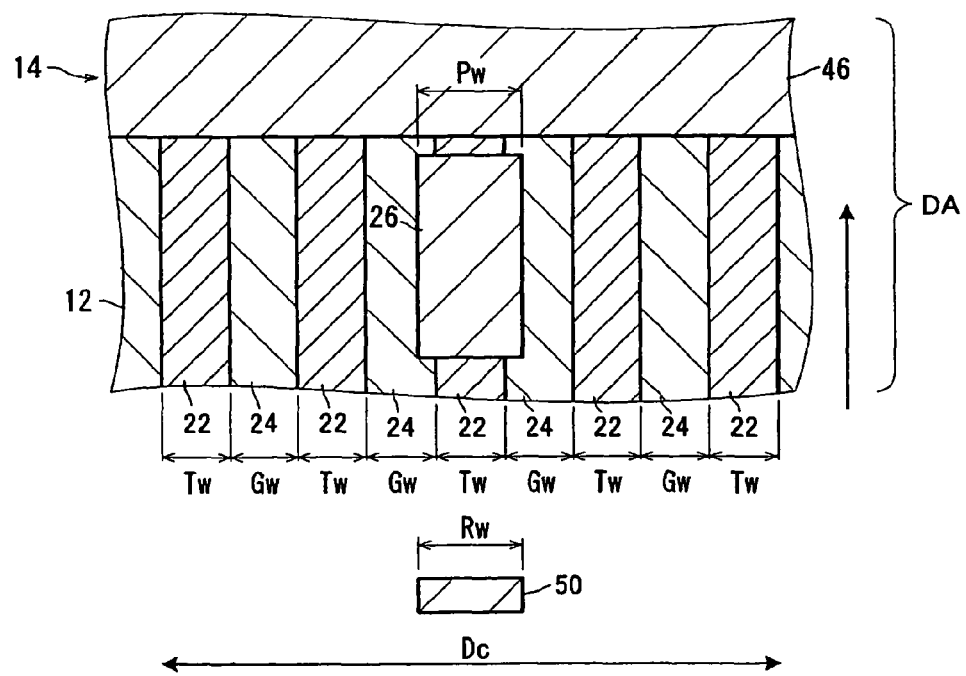
FIG. 3 is an enlarged plan view schematically illustrating the structures of the magnetic recording medium and a magnetic head of the magnetic recording and reproducing apparatus.
Figure 4:
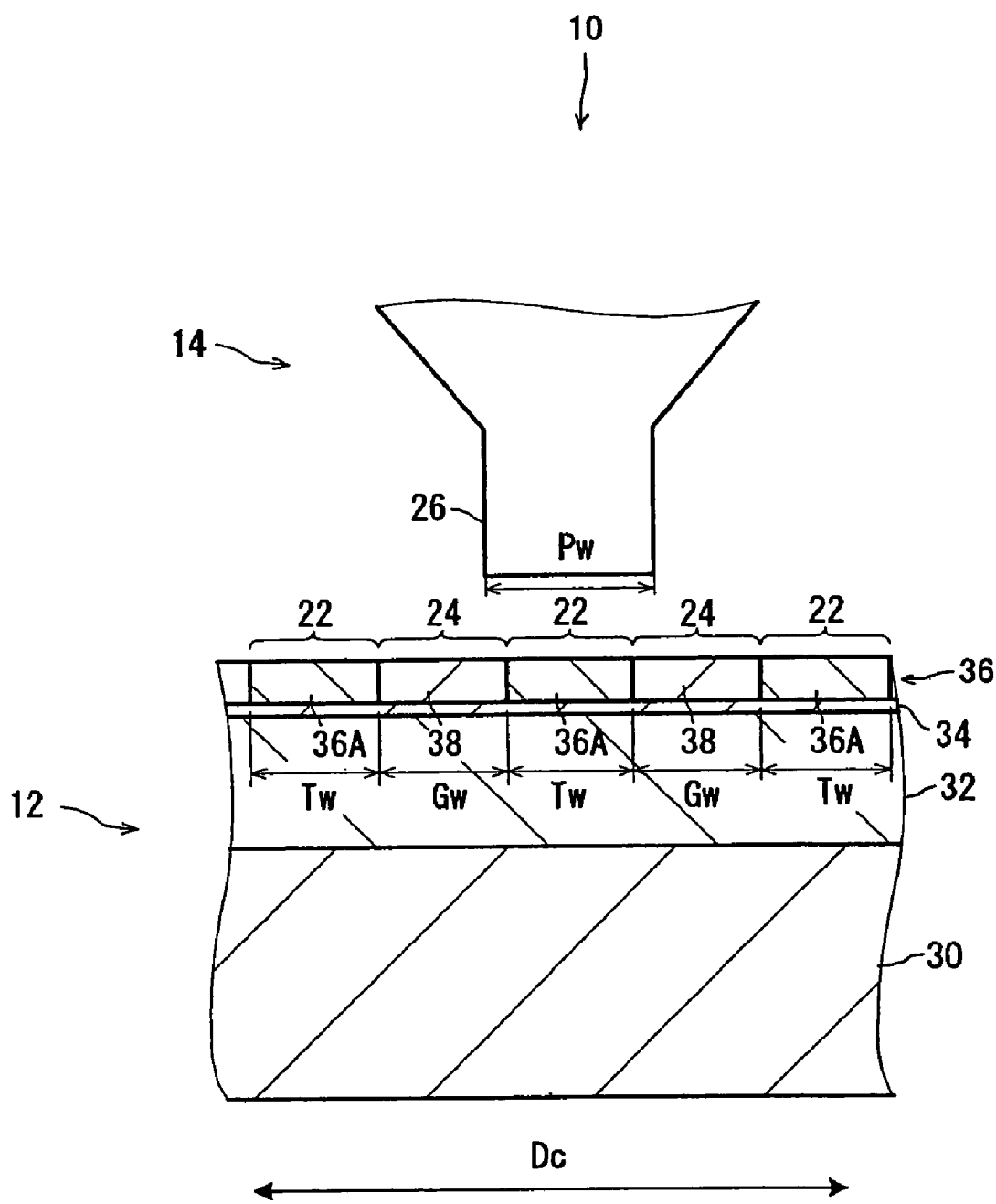
FIG. 4 is an enlarged cross-sectional view taken along a cross-track direction, schematically illustrating the structures of the magnetic recording medium and the magnetic head.

As shown in FIGS. 3 and 4, in the magnetic recording medium 12, portions corresponding to the track portions serve as recording areas 22, and portions corresponding to the gap portions between the recording areas 22 serve as non-recording areas 24 for magnetically isolating the recording areas 22 from one another. The track width Tw is preferably 30 to 60 nm. Moreover, the gap width Gw is preferably 20 to 50 nm.

In the magnetic recording and reproducing apparatus 10, the following inequality (I) is satisfied:

$$0.23 \times Fw + 1.2 \leq Hk \leq 0.26 \times Fw + 1.6, \quad (I)$$

where Hk (T) is an anisotropic magnetic field of the recording areas 22 of the magnetic recording medium 12, and Fw (T) is a recording magnetic field intensity of the recording magnetic field of the magnetic head 14 at the upper surface of the recording areas 22.

The description of other components will be omitted because it does not seem to be important for an understanding of the present exemplary embodiment.

The magnetic recording medium 12 includes a substrate 30, a soft magnetic layer 32, a seed layer 34, and a recording layer 36, and these layers are formed over the substrate 30 in that order.

A non-magnetic material such as glass, an Al alloy coated with NiP, Si, or Al2O3 can be used as the material for the substrate 30.

The soft magnetic layer 32 has a thickness of 50 to 300 nm. An Fe alloy, a Co amorphous alloy, ferrite, or the like can be used as the material for the soft magnetic layer 32. The soft magnetic layer 32 may have a stacked structure of a soft magnetic layer and a non-magnetic layer.

The seed layer 34 has a thickness of 2 to 40 nm. A non-magnetic CoCr alloy, Ti, Ru, a stacked body of Ru and Ta, or MgO can be used as the material for the seed layer 34.

In each of the data areas DA, the recording layer 36 is formed in a concavo-convex pattern corresponding to a track pattern, and convex portions of the concavo-convex pattern are recording elements 36A serving as the recording areas 22. Specifically, the recording layer 36 is divided into a large number of the recording elements 36A. In each of the date areas DA, the shape of each of the recording elements 36A corresponds to the shape of the track portion. FIGS. 3 and 4 illustrate the configuration of the recording layer 36 described above. In each of the servo areas SA, the recording layer 36 is formed into a predetermined servo pattern (not shown). The recording magnetic field intensity Fw is the intensity of the recording magnetic field of the magnetic head 14 at the upper surface of each recording element 36A.

The recording layer 36 has a thickness of 6 to 30 nm. The thicknesswise direction anisotropic magnetic field Hk of the recording layer 36 is preferably 1.2 T to 2.1 T and more preferably 1.4 T to 1.6 T. As the material for the recording layer 36, there can be used an alloy containing Co and Cr, such as a CoCrPt alloy, an alloy containing Co and Pt, an alloy containing Co and Pd, an alloy containing Fe and Pt, an alloy containing Fe and Co, stacked bodies thereof, a material formed of an oxide matrix, such as $SiO_2$, containing arrayed ferromagnetic particles, such as CoPt, or the like. The recording layer 36 is oriented so as to be magnetized in a direction perpendicular to the surface of the magnetic recording medium 12.

The side surfaces of each of the recording elements 36A may be tapered so as to incline toward the surface of the magnetic recording medium 12. In such a case, each of the track width Tw and the gap width Gw is a width at a position on the upper surface of the recording layer 36.

Each concave portion between the recording elements 36A which corresponds to the gap portion is filled with a filler material 38. The filler material 38 filled into the each concave portion forms the non-recording area 24. As the material for the filler material 38, there may be used an oxide such as SiO2, Al2O3, TiO2, MgO, ZrO2, or ferrite, a nitride such as AlN, a carbide such as SiC, DLC (diamond-like carbon), a non-magnetic metal such as Cu or Cr, a resin material, or the like. The upper surfaces of the recording elements 36A and the filler material 38 are substantially flat.

A protection layer and a lubrication layer may be formed in that order over the recording layer 36 and the filler material 38. However, the description of these layers is omitted because it does not seem to be important for an understanding of the present exemplary embodiment, and these layers are not shown in the drawings.

Moreover, an underlayer and an antiferromagnetic layer may be formed between the substrate 30 and the soft magnetic layer 32. However, the description of these layers is also omitted because it does not seem to be important for an understanding of the present exemplary embodiment, and these layers are not shown in the drawings.

Figure 5:
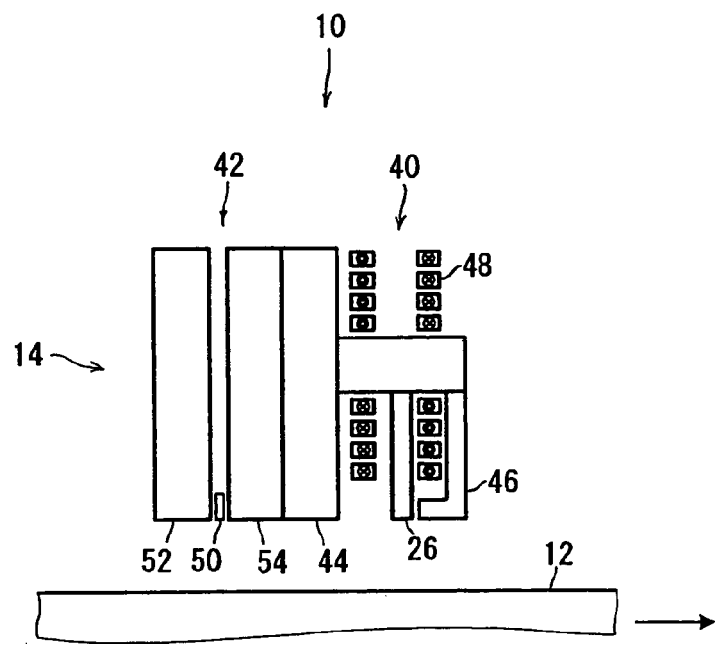
FIG. 5 is an enlarged cross-sectional view taken along the circumferential direction of a track portion, schematically illustrating the structures of the magnetic recording medium and the magnetic head.

As shown in FIG. 5, the magnetic head 14 includes a recording head portion 40 and a read head portion 42.

The recording head portion 40 includes: a main magnetic pole 26 for applying the recording magnetic field to the recording area 22; an auxiliary magnetic pole 44 disposed on the front side (the front side in the traveling direction of the magnetic head 14 relative to the driven magnetic recording medium 12) of the main magnetic pole 26; a trailing shield 46 disposed on the rear side (the rear side in the traveling direction of the magnetic head 14 relative to the driven magnetic recording medium 12) of the main magnetic pole 26; and an exciting coil 48. Each of the right arrow in FIG. 5 and the upward arrow in FIG. 3 represents the traveling direction of the magnetic recording medium 12.

The read head portion 42 is disposed on the front side of the recording head portion 40. The read head portion 42 includes: an MR element 50; a leading shield 52 disposed on the front side of the MR element 50; and an intermediate shield 54 disposed between the MR element 50 and the auxiliary magnetic pole 44.

As viewed along the circumferential direction of the track portion, the main magnetic pole 26 has a shape in which the end portion in close proximity to the magnetic recording medium 12 is narrower than the base end portion. The main magnetic pole width Pw, in the cross-track direction Dc, of the end of the main magnetic pole 26 is preferably 30 to 60 nm. As the material for the main magnetic pole 26, there may be used a soft magnetic material such as an alloy containing Co, an alloy containing Fe, an alloy containing Fe and Co, an alloy containing Fe and Ni, an alloy containing Fe and N, or an alloy containing Fe and Al. The magnetic gap between the lower surface of the main magnetic pole 26 and the upper surface of the recording layer 36 is preferably 6 to 15 nm.

FIG. 3 includes a cross-section of the magnetic head 14 which is taken near the end of the main magnetic pole 26 and which schematically illustrates the outside shape of the main magnetic pole 26 as viewed from a direction perpendicular to the surface of the magnetic recording medium 12. In FIG. 3, the hatched portions in the magnetic recording medium 12 are used to distinguish between the recording areas 22 and the non-recording areas 24 and do not represent a cross-section. In FIG. 3, the end of the main magnetic pole 26 has a rectangular shape viewed from the direction perpendicular to the surface of the magnetic recording medium 12. However, the end of the main magnetic pole 26 may have a substantially trapezoidal shape in which the rear side edge is longer than the front side edge. In this case, the above-described main magnetic pole width Pw (the width of the end of the main magnetic pole 26) is defined as the maximum width (the width of the longer rear side edge).

The MR element 50 is a TMR element, a GMR element, or the like. Preferably, the read head width Rw in the cross-track direction Dc at the end of the MR element 50 is 20 to 60 nm.

Next, a description will be given of the operation of the magnetic recording and reproducing apparatus 10.

In the magnetic recording and reproducing apparatus 10, the anisotropic magnetic field Hk (T) of the recording areas 22 of the magnetic recording medium 12 and the recording magnetic field intensity Fw (T) of the magnetic head 14 at the upper surface of the recording areas 22 satisfy the inequality (I) described above.

Therefore, even when the anisotropic magnetic field Hk of the recording areas 22 (the anisotropic magnetic field of the recording layer 36) is smaller than the value conventionally presumed, a magnetic signal can be recorded in the intended target recording area 22, and incorrect recording of the magnetic signal in a recording area 22 adjacent to the target recording area 22 can be suppressed.

When the recording magnetic field intensity Fw (T) is 1.3 or less, it is preferable that the anisotropic magnetic field Hk (T) and the recording magnetic field intensity Fw (T) satisfy the following inequality (II):

$$0.71 \times Fw + 0.72 \leq Hk \leq 1.5 \times Fw, \quad (II)$$

in order to record the magnetic signal in the intended target recording area 22 and to enhance the effect of suppressing incorrect recording of the magnetic signal in another recording area 22 adjacent to the target recording area 22.

When the recording magnetic field intensity Fw (T) is 1.3 or more, it is preferable that the anisotropic magnetic field Hk (T) and the recording magnetic field intensity Fw (T) satisfy the following inequality (III):

$$0.71 \times Fw + 0.72 \leq Hk \leq 1.9, \quad (III)$$

in order to record the magnetic signal in the intended target recording area 22 and to enhance the effect of suppressing incorrect recording of the magnetic signal in another recording area 22 adjacent to the target recording area 22.

The bases of the inequalities (I), (II), and (III) will be described in detail later in sections for simulation examples.

The anisotropic magnetic field Hk and the recording magnetic field intensity Fw may be limited within one of the following ranges (i), (ii), (iii), (iv), and (v):

(i) $1.1 \leq Fw \leq 1.2$ and $1.5 \leq Hk \leq 1.9$;
(ii) $1.2 \leq Fw \leq 1.3$ and $1.5 \leq Hk \leq 1.9$;
(iii) $1.3 \leq Fw \leq 1.4$ and $1.5 \leq Hk \leq Fw+0.6$;
(iv) $1.4 \leq Fw \leq 1.5$ and $Fw+0.1 \leq Hk \leq 2.0$; and
(v) $1.5 \leq Fw \leq 1.6$ and $1.6 \leq Hk \leq 2.0$.

In this manner, as in the case in which the anisotropic magnetic field Hk (T) and the recording magnetic field intensity Fw (T) satisfy the inequality (I) described above, even when the anisotropic magnetic field Hk of the recording areas 22 (the anisotropic magnetic field of the recording layer 36) is smaller than the value conventionally presumed, the magnetic signal can be recorded in the intended target recording area 22 and incorrect recording of the magnetic signal in another recording area 22 adjacent to the target recording area 22 can be suppressed.

Moreover, the anisotropic magnetic field Hk and the recording magnetic field intensity Fw may be limited within one of the following ranges (vi), (vii), (viii), (ix), and (x):

(vi) $1.1 \leq Fw \leq 1.2$ and $1.5 \leq Hk \leq Fw+0.5$;
(vii) $1.2 \leq Fw \leq 1.3$ and $2 \times Fw-0.9 \leq Hk \leq 2 \times Fw-0.7$;
(viii) $1.3 \leq Fw \leq 1.4$ and $Fw+0.4 \leq Hk \leq 1.9$;
(ix) $1.4 \leq Fw \leq 1.5$ and $1.8 \leq Hk \leq 1.9$; and
(x) $1.5 \leq Fw \leq 1.6$ and $1.8 \leq Hk \leq 1.9$.

In this manner, as in the case in which the anisotropic magnetic field Hk (T) and the recording magnetic field intensity Fw (T) satisfy the inequality (II) or (III) described above, the magnetic signal can be recorded in its intended target recording area 22 and the effect of suppressing incorrect recording of the magnetic signal in another recording area 22 adjacent to the target recording area 22 can be enhanced.

The bases of the ranges (i) to (x) will also be described in detail later in sections for simulation examples.

In the above exemplary embodiment, oxides such as SiO2, Al2O3, TiO2, MgO, ZrO2, and ferrite, nitrides such as AlN, carbides such as SiC, DLC, non-magnetic metals such as Cu or Cr, resin materials, and the like are exemplified as the material for the filler material 38. However, no particular limitation is imposed on the material for the filler material 38. Any material can be used so long as it is chemically stable and has the ability to retain a magnetic signal lower than that of the recording area or so long as it does not substantially have the ability to retain a magnetic signal in a reproducible manner. For example, as the material for the filler material 38, there may be used other non-magnetic material or a magnetic material that has the ability to retain a magnetic signal lower than that of the recording area to influence magnetically only to a negligible extent.

In the above exemplary embodiment, the filler material 38 is placed in the non-recording areas 24. However, portions corresponding to the recording areas or the non-recording areas in the recording layer may be subjected to ion injection treatment or treatment with a reaction gas to thereby form the non-recording areas having substantially no saturation magnetization and the recording areas having a sufficient saturation magnetization.

In the above exemplary embodiment, the filler material 38 is disposed in the non-recording areas 24 and therefore the surface of the magnetic recording medium 12 is substantially flat. However, so long as a stable head flying height can be obtained even when the surface of the magnetic recording medium 12 has a shape corresponding to the concavo-convex pattern of the recording layer 36 or a shape similar to the shape of the concavo-convex pattern, the filler material 38 may not be disposed in the non-recording areas 24. In this case, the concave portions serve as the non-recording areas 24.

In the above exemplary embodiment, the magnetic recording medium 12 is of the single-side recording type in which the recording layer 36 is formed on one side of the substrate 30. However, the present invention is applicable to a magnetic recording medium of the double-side recording type in which the recording layers are formed on both sides of the substrate.

In the above exemplary embodiment, the magnetic recording medium 12 is a discrete track medium in which the shape of each recording area 22 corresponds to the shape of the track portion. However, the present invention is applicable to a patterned medium in which each recording areas 22 has a shape formed by circumferentially dividing a track portion.

In the above exemplary embodiment, the track pattern of the magnetic recording medium 12 is a pattern composed of the concentric arc-shaped track portions. However, the present invention is applicable to a magnetic recording medium having a track pattern composed of a spiral track portion.

Figure 6:
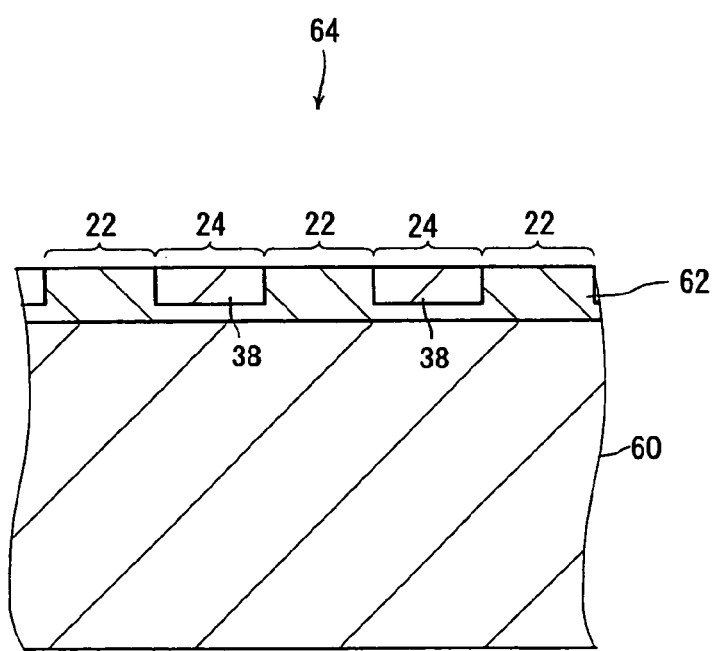
FIG. 6 is a cross-sectional view taken along the cross-track direction, schematically illustrating another example of the structure of the magnetic recording medium according to the exemplary embodiment of the present invention.
Figure 7:
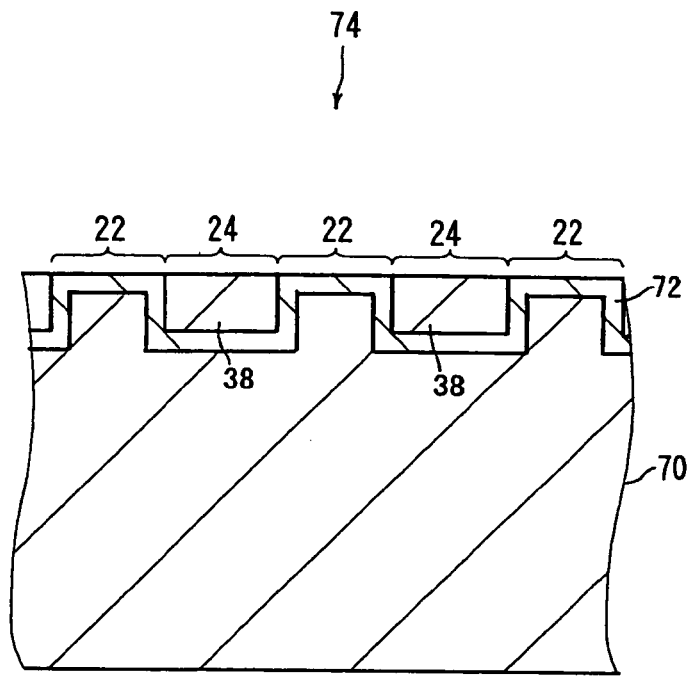
FIG. 7 is a cross-sectional view taken along the cross-track direction, schematically illustrating another example of the structure of the magnetic recording medium according to the exemplary embodiment of the present invention.
Figure 8:
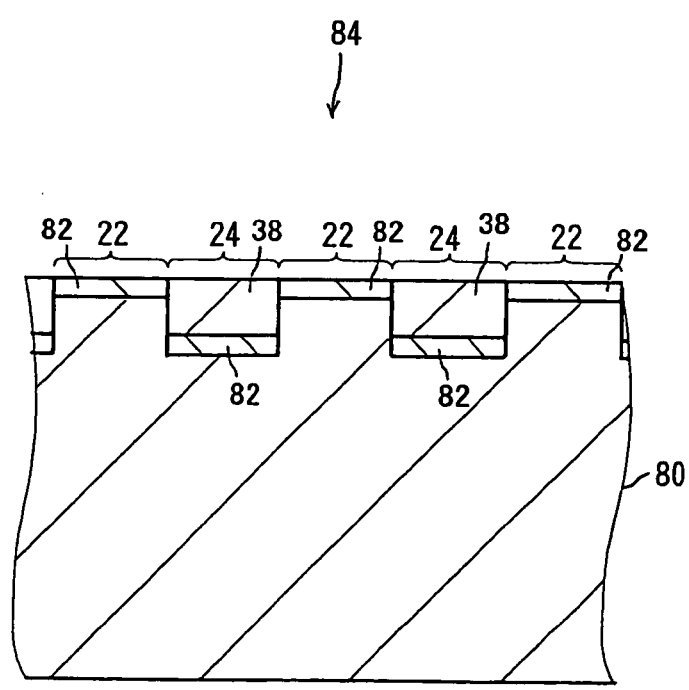
FIG. 8 is a cross-sectional view taken along the cross-track direction, schematically illustrating another example of the structure of the magnetic recording medium according to the exemplary embodiment of the present invention.
Figure 9:
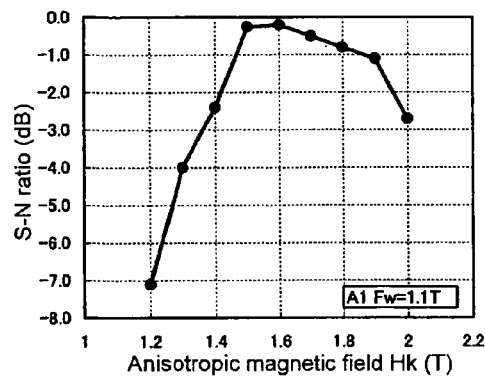
FIG. 9 is a graph showing the relationship between the anisotropic magnetic field of a recording area and S-N ratio in simulation model A1.
Figure 12:
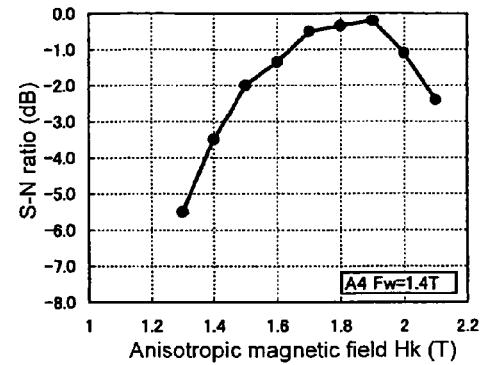
FIG. 12 is a graph showing the relationship between the anisotropic magnetic field of the recording area and S-N ratio in simulation model A4.
Figure 10:
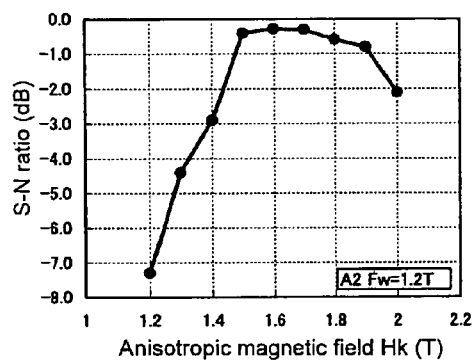
FIG. 10 is a graph showing the relationship between the anisotropic magnetic field of the recording area and S-N ratio in simulation model A2.
Figure 13:
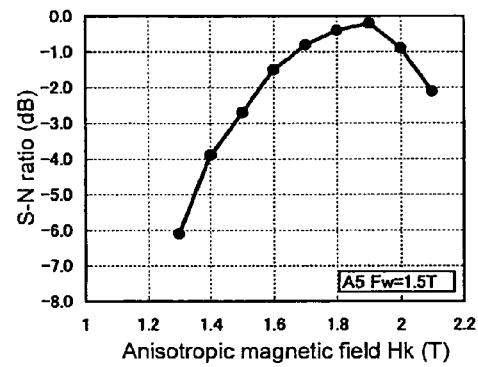
FIG. 13 is a graph showing the relationship between the anisotropic magnetic field of the recording area and S-N ratio in simulation model A5.
Figure 11:
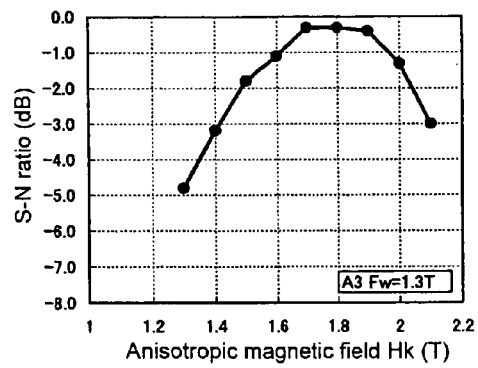
FIG. 11 is a graph showing the relationship between the anisotropic magnetic field of the recording area and S-N ratio in simulation model A3.
Figure 14:
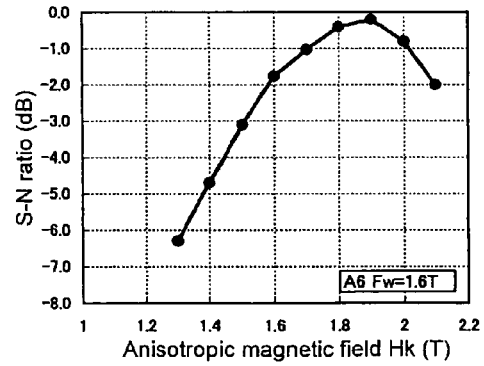
FIG. 14 is a graph showing the relationship between the anisotropic magnetic field of the recording area and S-N ratio in simulation model A6.

In the above exemplary embodiment, the recording layer 36 is divided into a large number of the recording elements 36A. However, the present invention is applicable to a magnetic recording medium 64 including a recording layer 62 formed in a concavo-convex pattern shown in FIG. 6. In this concavo-convex pattern, the lower portion on a substrate 60 side is continuous, and the upper surface in each non-recording area 24 is recessed from the upper surface in each recording area 22 toward the substrate 60 side. Also, the present invention is applicable to a magnetic recording medium 74 including a continuous recording layer 72 which is formed so as to follow the surface of the concavo-convex pattern of a substrate 70, as shown in FIG. 7. Moreover, the present invention is applicable to a magnetic recording medium 84 including a recording layer 82 which is formed separately on the upper surfaces of convex and concave portions of the concavo-convex pattern of a substrate 80, as shown in FIG. 8. In each of the exemplary embodiments shown in FIGS. 6 to 8, the recording magnetic field intensity Fw is the intensity of the recording magnetic field of the magnetic head 14 at the upper surface of a portion of the recording layer 62, 72, or 82 which is located in the recording area 22.

[Simulation Example A]

Six simulation models A1 to A6 were produced in which the track width Tw, the gap width Gw, the main magnetic pole width Pw, and the read head width Rw described in the above exemplary embodiment were set to values shown in column A of Table 1.

The value of the recording magnetic field intensity Fw (T) of the magnetic head 14 at the upper surface of the recording areas 22 was set to different values for the simulation models A1 to A6. Specifically, the recording magnetic field intensity Fw (T) was set to 1.1 T, 1.2 T, 1.3 T, 1.4 T, 1.5 T, and 1.6 T for the simulation models A1, A2, A3, A4, A5, and A6, respectively.

First, simulations were performed in which magnetic signals were recorded in their target recording areas 22 with a recording magnetic field generated by the main magnetic pole 26. In each of the simulation models A1 to A6, the anisotropic magnetic field Hk (T) of the recording areas 22 of the magnetic recording medium 12 (the anisotropic magnetic field Hk of the recording layer 36) was changed at intervals of 0.1 T and was set to different values in the range of 1.2 to 2.1 T. These simulations for the recording process were performed using the LLG (Landau-Lifshitz-Gilbert) equation.

TABLE 1

| Simulation example | A | B | C |
|---|---|---|---|
| Track width Tw (nm) | 30 | 40 | 60 |
| Gap width Gw (nm) | 20 | 40 | 50 |
| Anisotropic magnetic field Hk (T) | 1.2~2.1 (at intervals of 0.1) | | |
| Main magnetic pole width Pw (nm) | 60 | 50 | 30 |
| Recording magnetic field intensity Fw (T) | 1.1 (A1 B1 C1) | | |
| | 1.2 (A2 B2 C2) | | |
| | 1.3 (A3 B3 C3) | | |
| | 1.4 (A4 B4 C4) | | |
| | 1.5 (A5 B5 C5) | | |
| | 1.6 (A6 B6 C6) | | |
| Read head width Rw (nm) | 60 | 50 | 20 |

In the simulations, the center of the main magnetic pole 26 in the cross-track direction Dc was placed directly above the center of the target recording area 22 in the cross-track direction Dc. Each of the above values of the recording magnetic field intensity Fw (T) is the value at the center of the upper surface of the target recording area 22 in the cross-track direction Dc.

Other conditions were set as listed below. These conditions were common to the simulation models A1 to A6.

The thickness of the recording layer 36: 8 nm
The saturation magnetization of the recording layer 36: 1.0 T
The thickness of the soft magnetic layer 32: 80 nm
The saturation magnetization of the soft magnetic layer 32: 1.5 T
The saturation magnetization of the main magnetic pole 26: 2.3 T
The length Pt of the main magnetic pole 26 in the circumferential direction of the medium: 140 nm
The magnetic gap between the main magnetic pole 26 and the recording area 22: 10 nm
The exchange constant between the particles constituting the recording layer 36: $1\times10^{-7}$ erg/cm
The anisotropic distribution (the range of distribution of axes of easy magnetization in the recording layer 36): ±5°

Subsequently, simulations were performed in which the magnetic signals were reproduced from the respective target recording areas 22, and the S-N ratio (dB) was computed.

In these simulations, the center of the MR element 50 in the cross-track direction Dc was also placed directly above the center of the target recording area 22 in the cross-track direction Dc. The magnetic gap between the MR element 50 and the recording area 22 was set to 10 nm. In theses simulations for the reproducing process, the output was obtained by using the Lindholm distribution function as the sensitivity function of the MR element 50.

The simulation results of the S-N ratio of the reproducing signals for the simulation models A1 to A6 are shown in Table 2 and FIGS. 9 to 14. The values of the S-N ratio shown in Table 2 and FIGS. 9 to 14 are ones normalized based on the maximum absolute value (which is assumed as 0.0 dB) of the S-N ratio in the simulation model B6 of the simulation example B described later (the value of the S-N ratio at Hk=1.8 T in the simulation model B6). This maximum absolute value of the S-N ratio in the simulation model B6 was the largest among the simulation results for the simulation example A and the simulation examples B and C described later. The values of the S-N ratio for the simulation example B shown in Table 5 and FIGS. 17 to 22 and for the simulation example C shown in Table 8 and FIGS. 25 to 30 are also obtained in the same manner.

TABLE 2

| | | S-N ratio (dB) | | | | | |
|---|---|---|---|---|---|---|---|
| | | Simulation model | | | | | |
| | | A1 | A2 | A3 | A4 | A5 | A6 |
| Recording magnetic field intensity Fw (T) | | 1.1 | 1.2 | 1.3 | 1.4 | 1.5 | 1.6 |
| Anisotropic magnetic field Hk (T) | 1.2 | −7.1 | −7.3 | — | — | — | — |
| | 1.3 | −4.0 | −4.4 | −4.8 | −5.5 | −6.1 | −6.3 |
| | 1.4 | −2.4 | −2.9 | −3.2 | −3.5 | −3.9 | −4.7 |
| | 1.5 | −0.3 | −0.4 | −1.8 | −2.0 | −2.7 | −3.1 |
| | 1.6 | −0.2 | −0.3 | −1.1 | −1.4 | −1.5 | −1.8 |
| | 1.7 | −0.5 | −0.3 | −0.3 | −0.5 | −0.8 | −1.0 |
| | 1.8 | −0.8 | −0.6 | −0.3 | −0.4 | −0.4 | −0.4 |
| | 1.9 | −1.1 | −0.8 | −0.4 | −0.2 | −0.2 | −0.2 |
| | 2.0 | −2.7 | −2.1 | −1.3 | −1.1 | −0.9 | −0.8 |
| | 2.1 | — | — | −3.0 | −2.4 | −2.1 | −2.0 |

As shown in Table 2 and FIGS. 9 to 14, in each of the simulation models A1 to A6, the S-N ratio reached maximum at a certain value of the anisotropic magnetic field Hk (T) of the recording areas 22 of the magnetic recording medium 12 and decreased when the anisotropic magnetic field Hk (T) was less than and greater than this value.

When the anisotropic magnetic field Hk (T) of the recording areas 22 was small, the S-N ratio was small. This may be because the magnetic signal is recorded also in another recording area 22 adjacent to the target recording area 22. When the anisotropic magnetic field Hk (T) of the recording areas 22 was large, the S-N ratio was also small. This may be because the magnetic signal is incompletely recorded in the intended target recording area 22.

Figure 15:
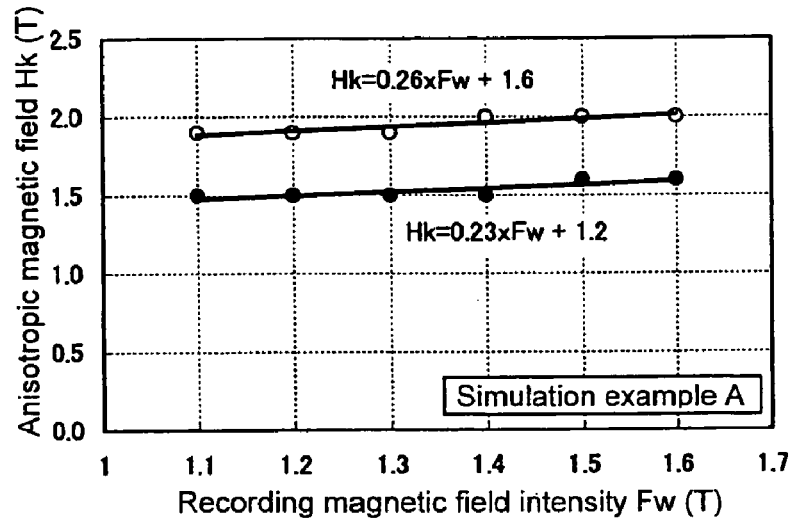
FIG. 15 is a graph for simulation example A showing the relationship between the value of recording magnetic field intensity and the bound values of the anisotropic magnetic field of the recording area at which a steep decrease in the S-N ratio occurs.

Moreover, when the anisotropic magnetic field Hk (T) was less than a certain lower bound value or greater than a certain upper bound value, the S-N ratio decreased steeply. Table 3 and FIG. 15 show the relationships between the value of the recording magnetic field intensity Fw (T) of each simulation model and lower and upper bound values of the anisotropic magnetic field Hk (T) of the recording areas 22 in each simulation model at which a steep decrease in the S-N ratio occurs.

TABLE 3

|  |  | Simulation model | | | | | |
|---|---|---|---|---|---|---|---|
|  |  | A1 | A2 | A3 | A4 | A5 | A6 |
| Recording magnetic field intensity Fw (T) | | 1.1 | 1.2 | 1.3 | 1.4 | 1.5 | 1.6 |
| Anisotropic magnetic field Hk (T) | Lower bound | 1.5 | 1.5 | 1.5 | 1.5 | 1.6 | 1.6 |
|  | Upper bound | 1.9 | 1.9 | 1.9 | 2.0 | 2.0 | 2.0 |

Figure 16:
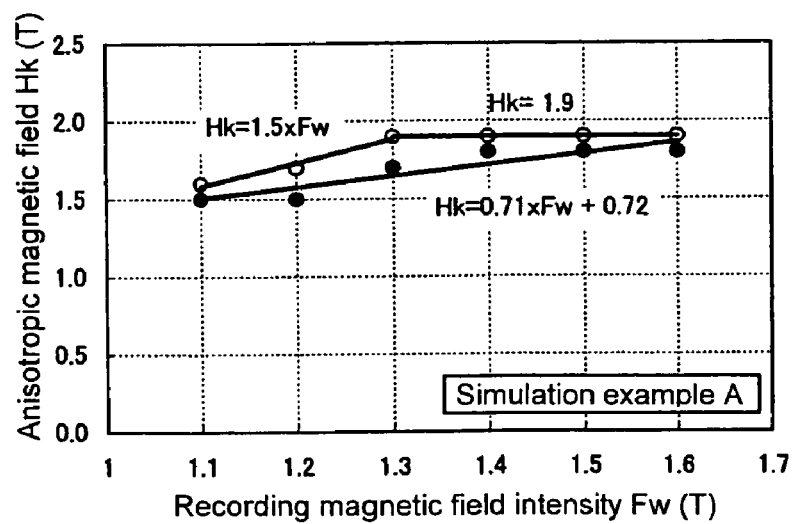
FIG. 16 is a graph for simulation example A showing the relationship between the value of recording magnetic field intensity and the bound values of the anisotropic magnetic field of the recording area at which the S-N ratio becomes smaller than the maximum value or a value close to the maximum value.
Figure 17:
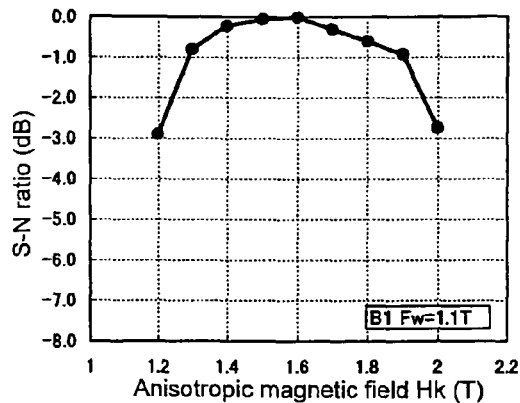
FIG. 17 is a graph showing the relationship between the anisotropic magnetic field of a recording area and S-N ratio in simulation model B1.
Figure 20:
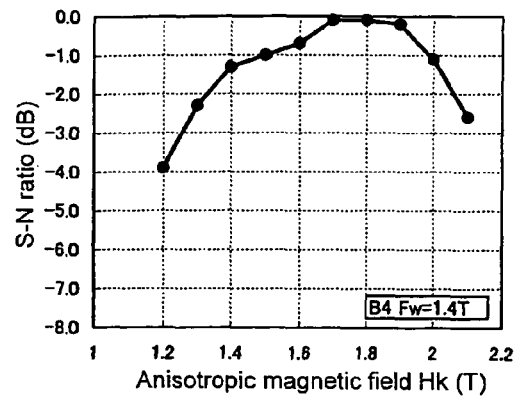
FIG. 20 is a graph showing the relationship between the anisotropic magnetic field of the recording area and S-N ratio in simulation model B4.
Figure 18:
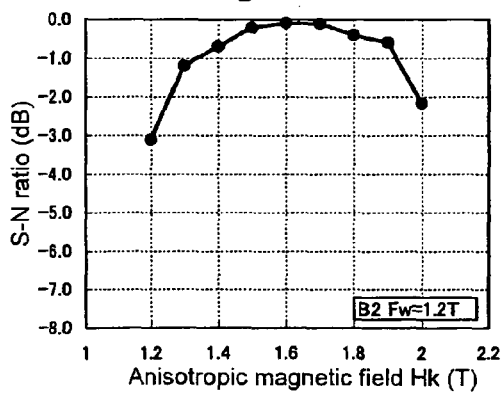
FIG. 18 is a graph showing the relationship between the anisotropic magnetic field of the recording area and S-N ratio in simulation model B2.
Figure 21:
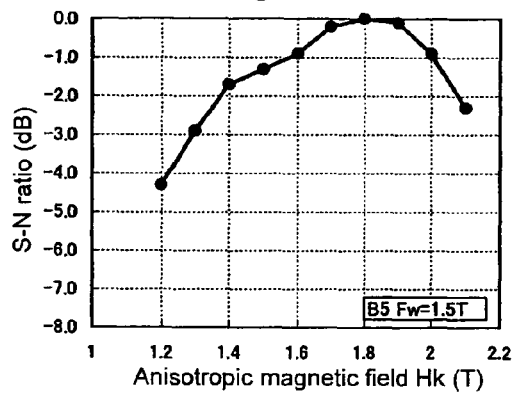
FIG. 21 is a graph showing the relationship between the anisotropic magnetic field of the recording area and S-N ratio in simulation model B5.
Figure 19:
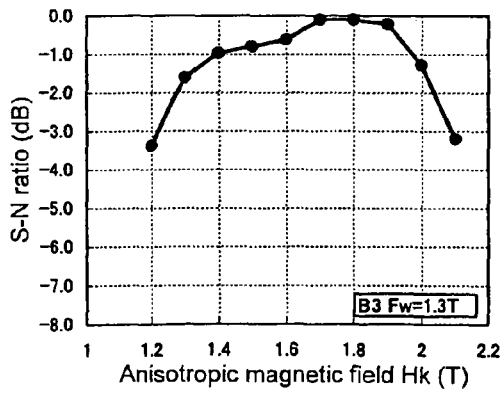
FIG. 19 is a graph showing the relationship between the anisotropic magnetic field of the recording area and S-N ratio in simulation model B3.
Figure 22:
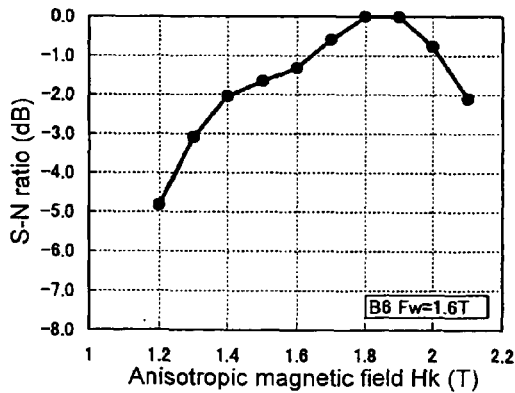
FIG. 22 is a graph showing the relationship between the anisotropic magnetic field of the recording area and S-N ratio in simulation model B6.

Table 4 and FIG. 16 show the relationships between the value of the recording magnetic field intensity Fw (T) of each simulation model and lower and upper bound values of the anisotropic magnetic field Hk (T) of the recording areas 22 in each simulation model at which the S-N ratio becomes smaller than the maximum value in each simulation model or a value close to the maximum value.

TABLE 4

|  |  | Simulation model | | | | | |
|---|---|---|---|---|---|---|---|
|  |  | A1 | A2 | A3 | A4 | A5 | A6 |
| Recording magnetic field intensity Fw (T) | | 1.1 | 1.2 | 1.3 | 1.4 | 1.5 | 1.6 |
| Anisotropic magnetic field Hk (T) | Lower bound | 1.5 | 1.5 | 1.7 | 1.8 | 1.8 | 1.8 |
|  | Upper bound | 1.6 | 1.7 | 1.9 | 1.9 | 1.9 | 1.9 |

[Simulation Example B]

Six simulation models B1 to B6 were produced in which the track width Tw, the gap width Gw, the main magnetic pole width Pw, and the read head width Rw were set to values shown in column B of Table 1, which are different from those in the simulation example A. As in the simulation example A, the recording magnetic field intensity Fw (T) was set to 1.1 T, 1.2 T, 1.3 T, 1.4 T, 1.5 T, and 1.6 T for the simulation models B1, B2, B3, B4, B5, and B6, respectively. The other conditions were the same as those in the simulation example A.

First, simulations were performed in which magnetic signals were recorded in their target recording areas 22 with a recording magnetic field generated by the main magnetic pole 26. In each of the simulation models B1 to B6, the anisotropic magnetic field Hk (T) of the recording areas 22 of the magnetic recording medium 12 was changed at intervals of 0.1 T and was set to different values in the range of 1.2 to 2.1 T, as in the simulation example A.

Subsequently, simulations were performed in which the magnetic signals were reproduced from the respective target recording areas 22, as in the simulation example A, and the S-N ratio (dB) was computed.

The simulation results of the S-N ratio of the reproducing signals for the simulation models B1 to B6 are shown in Table 5 and FIGS. 17 to 22.

TABLE 5

| S-N ratio (dB) | | | | | | | |
|---|---|---|---|---|---|---|---|
|  |  | Simulation model | | | | | |
|  |  | B1 | B2 | B3 | B4 | B5 | B6 |
| Recording magnetic field intensity Fw (T) | | 1.1 | 1.2 | 1.3 | 1.4 | 1.5 | 1.6 |
| Anisotropic magnetic field Hk (T) | 1.2 | −2.9 | −3.1 | −3.4 | −3.9 | −4.3 | −4.8 |
|  | 1.3 | −0.8 | −1.2 | −1.6 | −2.3 | −2.9 | −3.1 |
|  | 1.4 | −0.2 | −0.7 | −1.0 | −1.3 | −1.7 | −2.1 |
|  | 1.5 | 0.0 | −0.2 | −0.8 | −1.0 | −1.3 | −1.7 |
|  | 1.6 | 0.0 | −0.1 | −0.6 | −0.7 | −0.9 | −1.3 |
|  | 1.7 | −0.3 | −0.1 | −0.1 | −0.1 | −0.2 | −0.6 |
|  | 1.8 | −0.6 | −0.4 | −0.1 | −0.1 | 0.0 | 0.0 |
|  | 1.9 | −0.9 | −0.6 | −0.2 | −0.2 | −0.1 | 0.0 |
|  | 2.0 | −2.7 | −2.2 | −1.3 | −1.1 | −0.9 | −0.8 |
|  | 2.1 | — | — | −3.2 | −2.6 | −2.3 | −2.1 |

As in the simulation example A, in each of the simulation models B1 to B6, the S-N ratio reached maximum at a certain value of the anisotropic magnetic field Hk (T) of the recording areas 22 of the magnetic recording medium 12 and decreased when the anisotropic magnetic field Hk (T) was less than and greater than this value.

Figure 23:
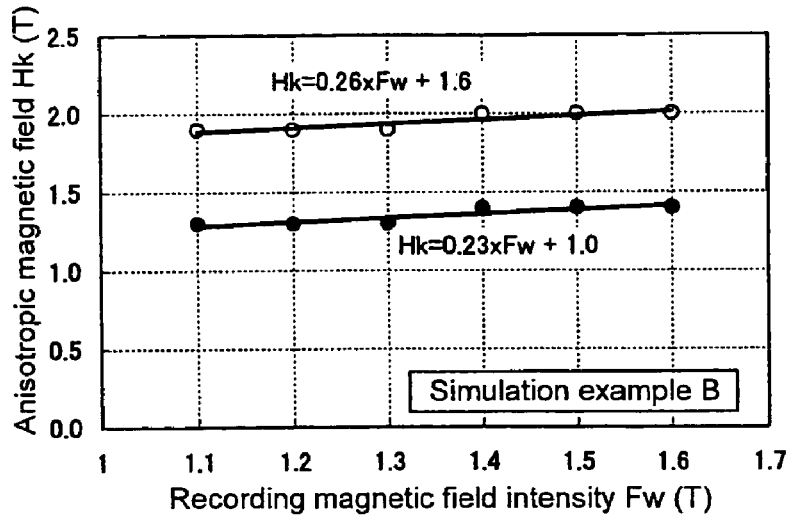
FIG. 23 is a graph for simulation example B showing the relationship between the value of recording magnetic field intensity and the bound values of the anisotropic magnetic field of the recording area at which a steep decrease in the S-N ratio occurs.

Moreover, when the anisotropic magnetic field Hk (T) was less than a certain lower bound value or greater than a certain upper bound value, the S-N ratio decreased steeply. Table 6 and FIG. 23 show the relationships between the value of the recording magnetic field intensity Fw (T) of each simulation model and lower and upper bound values of the anisotropic magnetic field Hk (T) of the recording areas 22 in each simulation model at which a steep decrease in the S-N ratio occurs.

TABLE 6

|  |  | Simulation model | | | | | |
|---|---|---|---|---|---|---|---|
|  |  | B1 | B2 | B3 | B4 | B5 | B6 |
| Recording magnetic field intensity Fw (T) | | 1.1 | 1.2 | 1.3 | 1.4 | 1.5 | 1.6 |
| Anisotropic magnetic field Hk (T) | Lower bound | 1.3 | 1.3 | 1.3 | 1.4 | 1.4 | 1.4 |
|  | Upper bound | 1.9 | 1.9 | 1.9 | 1.9 | 2.0 | 2.0 |

Figure 24:
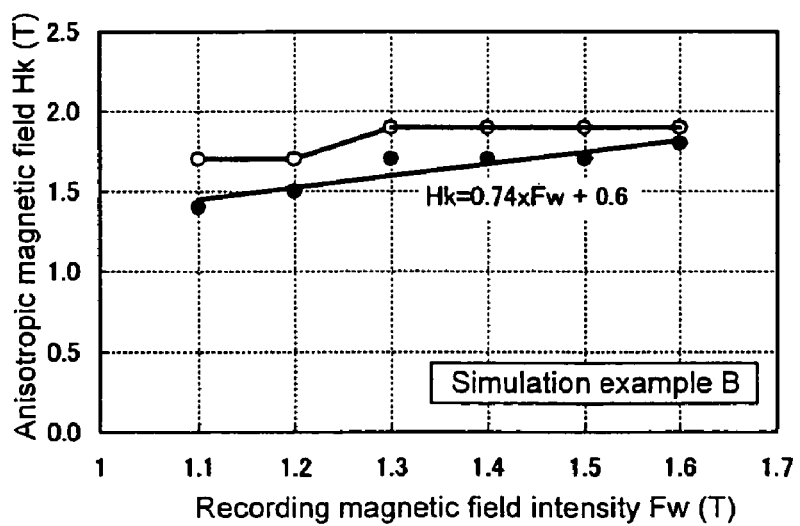
FIG. 24 is a graph for simulation example B showing the relationship between the value of recording magnetic field intensity and the bound values of the anisotropic magnetic field of the recording area at which the S-N ratio becomes smaller than the maximum value or a value close to the maximum value.
Figure 25:
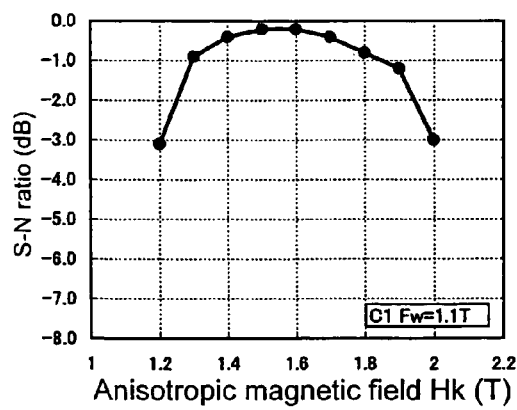
FIG. 25 is a graph showing the relationship between the anisotropic magnetic field of a recording area and S-N ratio in simulation model C1.
Figure 28:
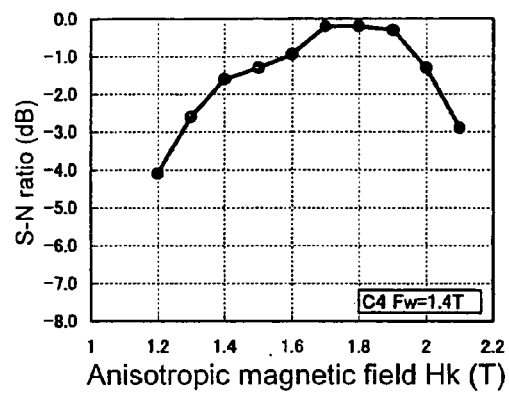
FIG. 28 is a graph showing the relationship between the anisotropic magnetic field of the recording area and S-N ratio in simulation model C4.
Figure 26:
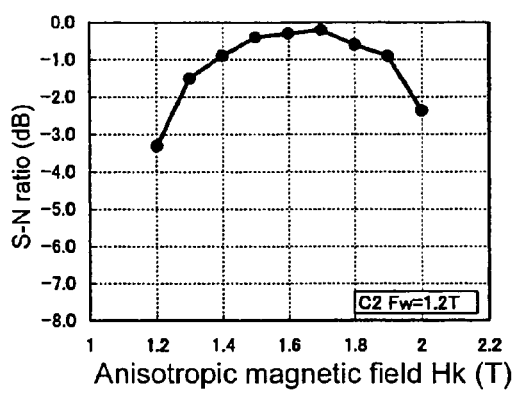
FIG. 26 is a graph showing the relationship between the anisotropic magnetic field of the recording area and S-N ratio in simulation model C2.
Figure 29:
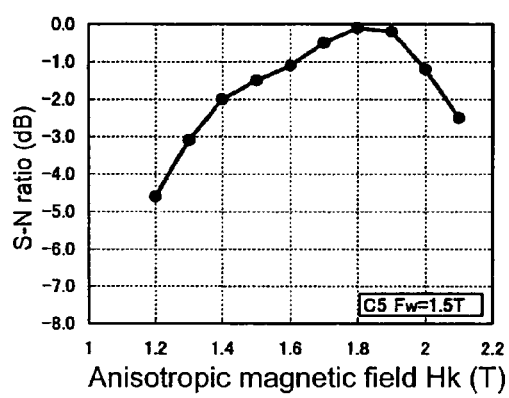
FIG. 29 is a graph showing the relationship between the anisotropic magnetic field of the recording area and S-N ratio in simulation model C5.
Figure 27:
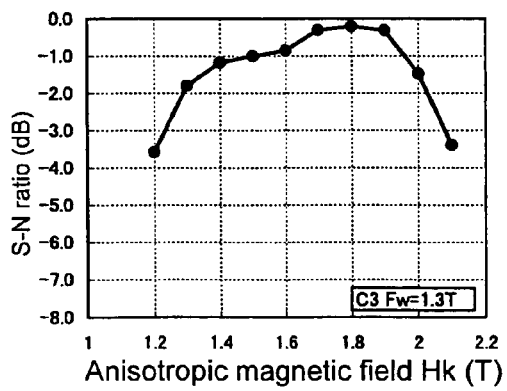
FIG. 27 is a graph showing the relationship between the anisotropic magnetic field of the recording area and S-N ratio in simulation model C3.
Figure 30:
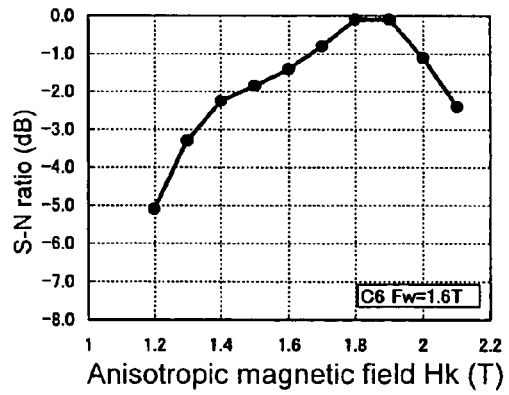
FIG. 30 is a graph showing the relationship between the anisotropic magnetic field of the recording area and S-N ratio in simulation model C6.

Table 7 and FIG. 24 show the relationships between the value of the recording magnetic field intensity Fw (T) of each simulation model and lower and upper bound values of the anisotropic magnetic field Hk (T) of the recording areas 22 in each simulation model at which the S-N ratio becomes smaller than the maximum value in each simulation model or a value close to the maximum value.

TABLE 7

|  |  | Simulation model | | | | | |
|---|---|---|---|---|---|---|---|
|  |  | B1 | B2 | B3 | B4 | B5 | B6 |
| Recording magnetic field intensity Fw (T) | | 1.1 | 1.2 | 1.3 | 1.4 | 1.5 | 1.6 |
| Anisotropic magnetic field Hk (T) | Lower bound | 1.4 | 1.5 | 1.7 | 1.7 | 1.7 | 1.8 |
|  | Upper bound | 1.7 | 1.7 | 1.9 | 1.9 | 1.9 | 1.9 |

[Simulation Example C]

Six simulation models C1 to C6 were produced in which the track width Tw, the gap width Gw, the main magnetic pole width Pw, and the read head width Rw were set to values shown in column C of Table 1, which are different from those in the simulation example A. As in the simulation example A, the recording magnetic field intensity Fw (T) was set to 1.1 T, 1.2 T, 1.3 T, 1.4 T, 1.5 T, and 1.6 T for the simulation models C1, C2, C3, C4, C5, and C6, respectively. The other conditions were the same as those in the simulation example A.

First, simulations were performed in which magnetic signals were recorded in their target recording areas 22 with a recording magnetic field generated by the main magnetic pole 26. In each of the simulation models C1 to C6, the anisotropic magnetic field Hk (T) of the recording areas 22 of the magnetic recording medium 12 was changed at intervals of 0.1 T and was set to different values in the range of 1.2 to 2.1 T, as in the simulation example A.

Subsequently, simulations were performed in which the magnetic signals were reproduced from the respective target recording areas 22, as in the simulation example A, and the S-N ratio (dB) was computed.

The simulation results of the S-N ratio for the simulation models C1 to C6 are shown in Table 8 and FIGS. 25 to 30.

TABLE 8

S-N ratio (dB)

| | | Simulation model | | | | | |
|---|---|---|---|---|---|---|---|
| | | C1 | C2 | C3 | C4 | C5 | C6 |
| Recording magnetic field intensity Fw (T) | | 1.1 | 1.2 | 1.3 | 1.4 | 1.5 | 1.6 |
| Anisotropic magnetic field Hk (T) | 1.2 | −3.1 | −3.3 | −3.6 | −4.1 | −4.6 | −5.1 |
| | 1.3 | −0.9 | −1.5 | −1.8 | −2.6 | −3.1 | −3.3 |
| | 1.4 | −0.4 | −0.9 | −1.2 | −1.6 | −2.0 | −2.3 |
| | 1.5 | −0.2 | −0.4 | −1.0 | −1.3 | −1.5 | −1.9 |
| | 1.6 | −0.2 | −0.3 | −0.9 | −0.9 | −1.1 | −1.4 |
| | 1.7 | −0.4 | −0.2 | −0.3 | −0.2 | −0.5 | −0.8 |
| | 1.8 | −0.8 | −0.6 | −0.2 | −0.2 | −0.1 | −0.1 |
| | 1.9 | −1.2 | −0.9 | −0.3 | −0.3 | −0.2 | −0.1 |
| | 2.0 | −3.0 | −2.4 | −1.5 | −1.3 | −1.2 | −1.1 |
| | 2.1 | — | — | −3.4 | −2.9 | −2.5 | −2.4 |

As in the simulation example A, in each of the simulation models C1 to C6, the S-N ratio reached maximum at a certain value of the anisotropic magnetic field Hk (T) of the recording areas 22 of the magnetic recording medium 12 and decreased when the anisotropic magnetic field Hk (T) was less than and greater than this value.

Figure 31:
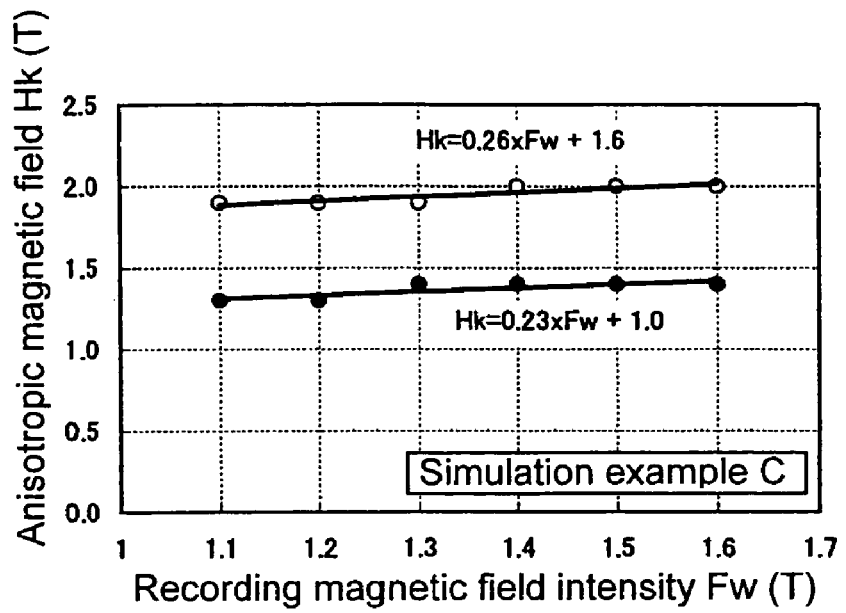
FIG. 31 is a graph for simulation example C showing the relationship between the value of recording magnetic field intensity and the bound values of the anisotropic magnetic field of the recording area at which a steep decrease in the S-N ratio occurs.

Moreover, when the anisotropic magnetic field Hk (T) was less than a certain lower bound value or greater than a certain upper bound value, the S-N ratio decreased steeply. Table 9 and FIG. 31 show the relationships between the value of the recording magnetic field intensity Fw (T) of each simulation model and lower and upper bound values of the anisotropic magnetic field Hk (T) of the recording areas 22 in each simulation model at which a steep decrease in the S-N ratio occurs.

TABLE 9

| | | Simulation model | | | | | |
|---|---|---|---|---|---|---|---|
| | | C1 | C2 | C3 | C4 | C5 | C6 |
| Recording magnetic field intensity Fw (T) | | 1.1 | 1.2 | 1.3 | 1.4 | 1.5 | 1.6 |
| Anisotropic magnetic field Hk (T) | Lower bound | 1.3 | 1.3 | 1.4 | 1.4 | 1.4 | 1.4 |
| | Upper bound | 1.9 | 1.9 | 1.9 | 2.0 | 2.0 | 2.0 |

Figure 32:
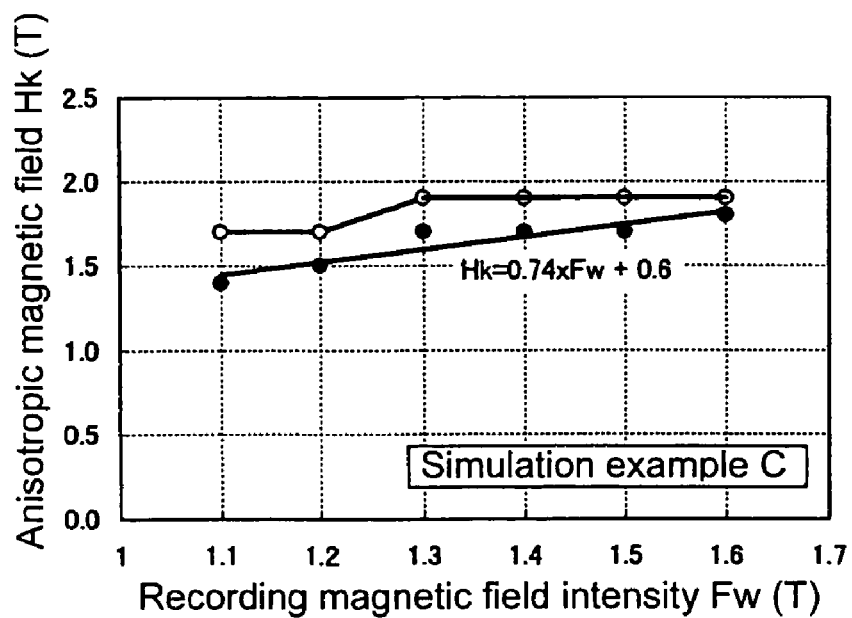
FIG. 32 is a graph for simulation example C showing the relationship between the value of recording magnetic field intensity and the bound values of the anisotropic magnetic field of the recording area at which the S-N ratio becomes smaller than the maximum value or a value close to the maximum value.

Table 10 and FIG. 32 show the relationships between the value of the recording magnetic field intensity Fw (T) of each simulation model and lower and upper bound values of the anisotropic magnetic field Hk (T) of the recording areas 22 in each simulation model at which the S-N ratio becomes smaller than the maximum value in each simulation model or a value close to the maximum value.

TABLE 10

| | | Simulation model | | | | | |
|---|---|---|---|---|---|---|---|
| | | C1 | C2 | C3 | C4 | C5 | C6 |
| Recording magnetic field intensity Fw (T) | | 1.1 | 1.2 | 1.3 | 1.4 | 1.5 | 1.6 |
| Anisotropic magnetic field Hk (T) | Lower bound | 1.4 | 1.5 | 1.7 | 1.7 | 1.7 | 1.8 |
| | Upper bound | 1.7 | 1.7 | 1.9 | 1.9 | 1.9 | 1.9 |

As shown in FIGS. 15, 23, and 31, in each of the simulation examples A, B, and C, the lower bound values of the anisotropic magnetic field Hk (T) of the recording areas 22 at which the steep decrease in the S-N ratio occurs increased or decreased linearly as the value of the recording magnetic field intensity Fw (T) of each simulation model increased or decreased. In addition, the upper bound value of the anisotropic magnetic field Hk (T) of the recording areas 22 at which the steep decrease in the S-N ratio occurs increased or decreased linearly as the value of the recording magnetic field intensity Fw (T) of each simulation model increased or decreased. The upper bound values were substantially the same for the simulation examples A, B, and C. However, although the lower bound values were substantially the same for the simulation examples B and C, the lower bound values for the simulation example A were slightly different from those for the simulation examples B and C.

Each of FIGS. 15, 23, and 31 for the simulation examples A, B, and C, respectively, shows a region between an approximate line for the lower bound values and an approximate line for the upper bound values, and these regions overlap one another. The overlapping portion is located within the region between the approximate line for the lower bound values and the approximate line for the upper bound values in FIG. 15 for the simulation example A.

As shown in Table 1, in the simulation example A, the track width Tw and the gap width Gw are smaller than those of the simulation example B and C, and the main magnetic pole width Pw and the read head width Rw are greater than those of the simulation examples B and C. Therefore, in the simulation example A, noise caused by the reproducing magnetic field of a recording area 22 adjacent to the target recording area 22 was believed to be large. The above results may be due to the reason described above. In the simulation example A, the most severe conditions were employed. When the value of the recording magnetic field intensity Fw (T) and the value of the anisotropic magnetic field Hk (T) are limited within the region between the approximate line for the lower bound values and the approximate line for the upper bound values in FIG. 15 for the simulation example A, a large S-N ratio is reliably obtained. This S-N ratio is greater than the S-N ratio in the region at which the steep decrease in the S-N ratio occurs.

The approximate line for the lower bound values in FIG. 15 for the simulation example A is represented by $Hk = 0.23 \times Fw + 1.2$.

The approximate line for the upper bound values is represented by $Hk = 0.26 \times Fw + 1.6$.

Therefore, when the anisotropic magnetic field Hk (T) of the recording areas 22 of the magnetic recording medium 12 and the recording magnetic field intensity Fw (T) of the magnetic head 14 at the upper surface of the recording areas 22 satisfy the inequality (I) described above, a large S-N ratio is reliably obtained, which is greater than the S-N ratio in the region at which the steep decrease in the S-N ratio occurs.

Next, attention is focused on five regions in FIG. 15 for the simulation example A in which the recording magnetic field intensity Fw is changed at intervals of 0.1 (T) in the range of 1.1 to 1.6. Specifically, the anisotropic magnetic field Hk and the recording magnetic field intensity Fw are limited within the following five ranges (i), (ii), (iii), (iv), and (v):

(i) $1.1 \leq Fw \leq 1.2$ and $1.5 \leq Hk \leq 1.9$;
(ii) $1.2 \leq Fw \leq 1.3$ and $1.5 \leq Hk \leq 1.9$;
(iii) $1.3 \leq Fw \leq 1.4$ and $1.5 \leq Hk \leq Fw+0.6$;
(iv) $1.4 \leq Fw \leq 1.5$ and $Fw+0.1 \leq Hk \leq 2.0$; and
(v) $1.5 \leq Fw \leq 1.6$ and $1.6 \leq Hk \leq 2.0$. Also in this case, a large S-N ratio is reliably obtained, which is greater than the S-N ratio in the region at which the steep decrease in the S-N ratio occurs.

As shown in FIGS. 16, 24, and 32, in each of the simulation examples A, B, and C, the lower bound value of the anisotropic magnetic field Hk (T) of the recording areas 22 at which the S-N ratio becomes smaller than the maximum value in each simulation model or a value close to the maximum value increased or decreased linearly as the value of the recording magnetic field intensity Fw (T) in each simulation model increased or decreased. Moreover, when the recording magnetic field intensity Fw was 1.2 T or more and 1.3 T or less, the upper bound value of the anisotropic magnetic field Hk (T) of the recording areas 22 at which the S-N ratio becomes smaller than the maximum value in each simulation model or a value close to the maximum value increased or decreased as the value of the recording magnetic field intensity Fw (T) in each simulation model increased or decreased. However, when the recording magnetic field intensity Fw was 1.2 T or less or is 1.3 T or more, the upper bound value of the anisotropic magnetic field Hk (T) of the recording areas 22 at which the S-N ratio becomes smaller than the maximum value in each simulation model or a value close to the maximum value was substantially constant. The upper and lower bound values were substantially the same for the simulation examples B and C. However, the upper and lower bound values for the simulation example A were different from those for the simulation examples B and C.

Each of FIGS. 16, 24, and 32 for the simulation examples A, B, and C, respectively, shows a region between an approximate line for the lower bound values and approximate lines for the upper bound values, and these regions overlap one another. The overlapping portion is located within the region between the approximate line for the lower bound values and the approximate lines for the upper bound values in FIG. 16 for the simulation example A.

The approximate line for the lower bound values in FIG. 16 for the simulation example A is represented by $Hk=0.71 \times Fw+0.72$.

When the recording magnetic field intensity Fw is 1.3 T or less, the approximate line for the upper bound values is represented by $Hk=1.5 \times Fw$.

When the recording magnetic field intensity Fw is 1.3 T or more, $Hk=1.9$.

Therefore, when the anisotropic magnetic field Hk (T) of the recording areas 22 of the magnetic recording medium 12 and the recording magnetic field intensity Fw (T) of the magnetic head 14 at the upper surface of the recording areas 22 satisfy the inequality (II) or (III) described above, an S-N ratio the same as or close to the maximum value is reliably obtained.

Next, attention is focused on five regions in FIG. 16 for the simulation example A in which the recording magnetic field intensity Fw was set at intervals of 0.1 (T) in the range of 1.1 to 1.6. Specifically, the anisotropic magnetic field Hk and the recording magnetic field intensity Fw are limited within the following five ranges (vi), (vii), (viii), (ix), and (x):

(vi) $1.1 \leq Fw \leq 1.2$ and $1.5 \leq Hk \leq Fw+0.5$;
(vii) $1.2 \leq Fw \leq 1.3$ and $2 \times Fw-0.9 \leq Hk \leq 2 \times Fw-0.7$;
(viii) $1.3 \leq Fw \leq 1.4$ and $Fw+0.4 \leq Hk \leq 1.9$;
(ix) $1.4 \leq Fw \leq 1.5$ and $1.8 \leq Hk \leq 1.9$; and
(x) $1.5 \leq Fw \leq 1.6$ and $1.8 \leq Hk \leq 1.9$. Also in this case, an S-N ratio the same as or close to the maximum value is reliably obtained.

Note that, in each of the simulation examples A to C, even when the thickness of the recording layer 36, the magnetic gap between the main magnetic pole 26 and the recording area 22, and the magnetic gap between the MR element 50 and the recording area 22 are varied, the value of the S-N ratio of the reproducing signal is almost unchanged. For example, when the thickness of the recording layer 36, the magnetic gap between the main magnetic pole 26 and the recording area 22, and the magnetic gap between the MR element 50 and the recording area 22 are in the ranges of 6 to 30 nm, 6 to 15 nm, and 6 to 15 nm, respectively, the value of the S-N ratio of the reproducing signal in each simulation model is almost unchanged even when the values of the thickness and the magnetic gaps are varied.

Figure 33:
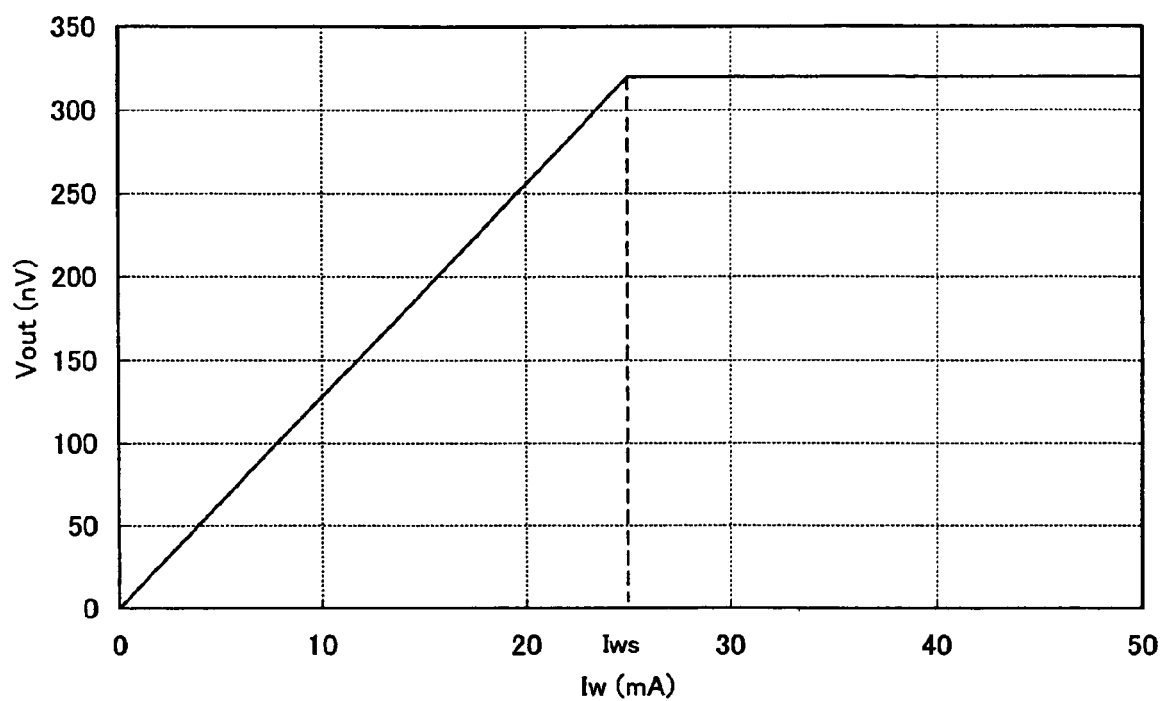
FIG. 33 is a graph schematically showing the relationship between the magnitude of recording current and the output caused by the reproducing magnetic field generated from a recording layer.

Next, an example of the method for measuring the recording magnetic field intensity Fw will be described. First, the relationship between the recording current applied to the recording head portion to generate the recording magnetic field and the output caused by the reproducing magnetic field generated from the recording layer magnetized at the applied recording current is determined. Specifically, a sufficiently small recording current is applied to the recording head portion to apply a recording magnetic field to the recording layer of the magnetic recording medium in a magnetically AC-erased state, whereby the recording layer is magnetized. At this time, it is preferable to magnetize the recording layer such that recording bits with the same polarity (magnetized direction) are continuously formed along the circumferential direction over a length of 200 nm or more in the recording area of the recording layer. For example, when the minimum recording bit length 1 T is 20 nm, it is preferable to record a signal of 10 T or more in the recording layer. Subsequently, the reproducing magnetic field generated from the magnetized recording layer is detected with the read head portion, and the output caused by the reproducing magnetic field is measured. The output caused by the reproducing magnetic field can be measured as, for example, a potential difference generated in the MR element of the read head portion by the reproducing magnetic field or a value obtained by amplifying the potential difference by a constant factor. Then, the same measurement is repeated while the recording current is gradually increased. Since the recording magnetic field intensity Fw is proportional to the magnitude of the recording current, the degree of magnetization increases as the magnitude of the recording current increases until the recording layer is saturated magnetically, and therefore the output caused by the reproducing magnetic field increases as shown in FIG. 33. When the magnitude of the recording current becomes a predetermined value or more and the recording layer is saturated magnetically, the output caused by the reproducing magnetic field generated from the recording layer remains constant irrespective of the magnitude of the recording current. In FIG. 33, "Iw" in the horizontal axis represents the magnitude of the recording current, and "Iws" is the lower limit of the recording current at which the recording layer is magnetically saturated. "Vout" in the vertical axis represents the potential difference generated in the read head portion by the reproducing magnetic field or a value obtained by amplifying the potential difference by a constant factor.

Next, the saturation magnetic field Hs of the recording layer of the magnetic recording medium is measured. The saturation magnetic field Hs is determined using a hysteresis loop obtained by applying an external magnetic field to the magnetic material forming the recording layer and is the lower limit of the external magnetic field at which the magnetic material is saturated magnetically. The saturation magnetic field Hs of the recording layer in the magnetic recording medium can be measured using, for example, the magnetic Kerr effect.

As described above, the recording magnetic field intensity Fw is proportional to the magnitude of the recording current. When the magnitude of the recording current is Iws, it is presumed that a recording magnetic field of Hs is applied to the recording layer of the magnetic recording medium. Therefore, the recording magnetic field intensity Fw can be computed from Iw, Iws, and Hs using the following equation:

$$Fw = Hs \times Iw/Iws.$$

In order to measure the relationship between the recording current Iw and the output Vout caused by the reproducing magnetic field, the magnitude of the recording current applied to the recording head portion must be controlled as described above. However, in a general magnetic recording and reproducing apparatus, the magnitude of the recording current is held constant and may not be controlled. In such a case, the magnetic head and the magnetic recording medium are removed from the magnetic recording and reproducing apparatus. The removed magnetic head and magnetic recording medium are mounted in a measurement apparatus that can change the magnitude of the recording current applied to the recording head portion, and then the relationship between the recording current Iw and the output Vout caused by the reproducing magnetic field is measured.

The present invention is applicable to a magnetic recording and reproducing apparatus including a magnetic recording medium in which portions corresponding to track portions or part thereof serve as recording areas having a width the same as the width of the track portion and in which portions between the recording areas serve as non-recording areas.

What is claimed is:

1. A magnetic recording and reproducing apparatus, comprising:
a magnetic recording medium of a perpendicular recording type, the magnetic recording medium including a track pattern having track portions and gap portions arranged so as to be alternately adjacent to each other in a cross-track direction, at least part of portions corresponding to the track portions being recording areas having a width substantially the same as a width of the track portions, portions between the recording areas being non-recording areas; and
a magnetic head of a perpendicular recording type for applying a recording magnetic field to the recording areas, wherein
an anisotropic magnetic field Hk (T) of the recording areas of the magnetic recording medium and a recording magnetic field intensity Fw (T) of the recording magnetic field at an upper surface of the recording areas satisfy the following inequality (I):

$$0.23 \times Fw + 1.2 \leq Hk \leq 0.26 \times Fw + 1.6. \quad (I)$$

2. The magnetic recording and reproducing apparatus according to claim 1, wherein the recording magnetic field intensity Fw (T) is 1.3 or less, and the following inequality (II) is satisfied:

$$0.71 \times Fw + 0.72 \leq Hk \leq 1.5 \times Fw. \quad (II)$$

3. The magnetic recording and reproducing apparatus according to claim 1, wherein the recording magnetic field intensity Fw (T) is 1.3 or more, and the following inequality (III) is satisfied:

$$0.71 \times Fw + 0.72 \leq Hk \leq 1.9. \quad (III)$$

4. The magnetic recording and reproducing apparatus according to claim 1, wherein the recording magnetic field intensity Fw (T) is 1.1 or more.

5. A magnetic recording and reproducing apparatus, comprising:
a magnetic recording medium of a perpendicular recording type, the magnetic recording medium including a track pattern having track portions and gap portions arranged so as to be alternately adjacent to each other in a cross-track direction, at least part of portions corresponding to the track portions being recording areas having a width substantially the same as a width of the track portions, portions between the recording areas being non-recording areas; and
a magnetic head of a perpendicular recording type for applying a recording magnetic field to the recording areas, wherein
an anisotropic magnetic field Hk (T) of the recording areas of the magnetic recording medium and a recording magnetic field intensity Fw (t) of the recording magnetic field at an upper surface of the recording areas are limited within one of the following ranges (i), (ii), (iii), (iv), and (v):
(i) $1.1 \leq Fw \leq 1.2$ and $1.5 \leq Hk \leq 1.9$;
(ii) $1.2 \leq Fw \leq 1.3$ and $1.5 \leq Hk \leq 1.9$;
(iii) $1.3 \leq Fw \leq 1.4$ and $1.5 \leq Hk \leq Fw+0.6$;
(iv) $1.4 \leq Fw \leq 1.5$ and $Fw+0.1 \leq Hk \leq 2.0$; and
(v) $1.5 \leq Fw \leq 1.6$ and $1.6 \leq Hk \leq 2.0$.

6. The magnetic recording and reproducing apparatus according to claim 5, wherein the anisotropic magnetic field Hk and the recording magnetic field intensity Fw are limited within one of the following ranges (vi), (vii), (viii), (ix), and (x):
(vi) $1.1 \leq Fw \leq 1.2$ and $1.5 \leq Hk \leq Fw+0.5$;
(vii) $1.2 \leq Fw \leq 1.3$ and $2 \times Fw - 0.9 \leq Hk \leq 2 \times Fw - 0.7$;
(viii) $1.3 \leq Fw$ and $Fw+0.4 \leq Hk \leq 1.9$;
(ix) $1.4 \leq Fw \leq 1.5$ and $1.8 \leq Hk \leq 1.9$; and
(x) $1.5 \leq Fw \leq 1.6$ and $1.8 \leq Hk \leq 1.9$.

* * * * *